US012297556B2

(12) United States Patent
Hirai et al.

(10) Patent No.: US 12,297,556 B2
(45) Date of Patent: May 13, 2025

(54) SILVER-PLATED PRODUCT AND METHOD FOR PRODUCING SAME

(71) Applicant: DOWA METALTECH CO., LTD., Tokyo (JP)

(72) Inventors: Yutaro Hirai, Tokyo (JP); Kentaro Arai, Tokyo (JP); Yosuke Sato, Tokyo (JP)

(73) Assignee: DOWA METALTECH CO., LTD., Tokyo (JP)

( * ) Notice: Subject to any disclaimer, the term of this patent is extended or adjusted under 35 U.S.C. 154(b) by 0 days.

(21) Appl. No.: 17/802,017

(22) PCT Filed: Jan. 14, 2021

(86) PCT No.: PCT/JP2021/001042
§ 371 (c)(1),
(2) Date: Aug. 24, 2022

(87) PCT Pub. No.: WO2021/171818
PCT Pub. Date: Sep. 2, 2021

(65) Prior Publication Data

US 2023/0097787 A1 Mar. 30, 2023

(30) Foreign Application Priority Data

Feb. 25, 2020 (JP) ................................ 2020-029193
Dec. 16, 2020 (JP) ................................ 2020-208347

(51) Int. Cl.

*C25D 3/46* (2006.01)
*C25D 3/64* (2006.01)
*C25D 5/12* (2006.01)
*H01H 1/025* (2006.01)
*H01H 11/04* (2006.01)

(52) U.S. Cl.
CPC ................ *C25D 3/46* (2013.01); *C25D 3/64* (2013.01); *C25D 5/12* (2013.01); *H01H 1/025* (2013.01); *H01H 11/04* (2013.01)

(58) Field of Classification Search
None
See application file for complete search history.

(56) References Cited

U.S. PATENT DOCUMENTS

| | | | | |
|---|---|---|---|---|
| 9,074,681 | B2 | 7/2015 | Hanlon et al. | |
| 2007/0284258 | A1* | 12/2007 | Yoshimoto | C25D 5/34 205/263 |
| 2009/0229987 | A1* | 9/2009 | Miyazawa | C25D 15/02 205/109 |
| 2016/0265127 | A1* | 9/2016 | Sadamori | C25D 7/00 |

FOREIGN PATENT DOCUMENTS

| | | | |
|---|---|---|---|
| CN | 104073844 | A | * 10/2014 |
| JP | S5743995 | A | 3/1982 |
| JP | 2008169408 | A | 7/2008 |
| JP | 2009079250 | A | 4/2009 |
| JP | 2013216975 | A | 10/2013 |
| JP | 2014025093 | A | 2/2014 |
| JP | 2016145413 | A | 8/2016 |
| JP | 2016166396 | A | 9/2016 |
| JP | 2016204719 | A | 12/2016 |
| WO | 2016121312 | A1 | 8/2016 |

OTHER PUBLICATIONS

Machine translation of Wang CN 104073844 A (Year: 2014).*
International search report for PCT/JP2021/001042 dated Mar. 16, 2021.
Extended European Search Report dated Nov. 17, 2023 for corresponding application EP21759554.5.

* cited by examiner

*Primary Examiner* — Wojciech Haske
(74) *Attorney, Agent, or Firm* — Bachman & LaPointe, P.C.

(57) ABSTRACT

A silver-plated product having a higher hardness and more excellent wear resistance than those of conventional silver-plated products, and a method for producing the same. In a method for producing a silver-plated product by forming a surface layer of silver on a base material by electroplating at a current density in a silver-plating solution which is an aqueous solution containing silver potassium cyanide or silver cyanide, potassium cyanide or sodium cyanide, and a benzimidazole (such as 2-mercaptobenzmimidazole or 2-mercaptobenzimidazole sulfonic acid sodium salt dihydrate), the ratios of the concentrations of silver potassium cyanide or silver cyanide, potassium cyanide or sodium cyanide, and the imidazole to the current density during the silver-plating (or the ratios of the concentrations of silver potassium cyanide or silver cyanide and the imidazole to the current density during the silver plating, and the concentration of potassium cyanide or sodium cyanide) are set to be predetermined ranges, respectively.

26 Claims, No Drawings

SILVER-PLATED PRODUCT AND METHOD FOR PRODUCING SAME

BACKGROUND

The present invention generally relates to a silver-plated product and a method for producing the same. More specifically, the invention relates to a silver-plated product used as the material of contact and terminal parts, such as connectors, switches and relays, which are used for on-vehicle and/or household electric wiring, and a method for producing the same.

As conventional materials of contact and terminal parts, such as connectors and switches, there are used plated products wherein a base material of copper, a copper alloy, stainless steel or the like, which are relatively inexpensive and which have excellent corrosion resistance, mechanical characteristics and so forth, is plated with tin, silver, gold or the like in accordance with required characteristics, such as electrical and soldering characteristics.

Tin-plated products obtained by plating a base material of copper, a copper alloy, stainless steel or the like, with tin are inexpensive, but they do not have good corrosion resistance in a high-temperature environment. Gold-plated products obtained by plating such a base material with gold have excellent corrosion resistance and high reliability, but the costs thereof are high. On the other hand, silver-plated products obtained by plating such a base material with silver are inexpensive in comparison with gold-plated products and have excellent corrosion resistance in comparison with tin-plated products.

The materials of contact and terminal parts, such as connectors and switches, are also required to have good wear resistance against the insertion and extraction of connectors and/or the sliding movements of switches.

However, silver-plated products are soft and easy to wear. For that reason, if the silver-plated product is used as the material of a connecting terminal or the like, there is a problem in that the insertion and extraction and/or the sliding movement cause the adhesion thereof to easily cause the adhesive abrasion thereof. There is also a problem in that the surface of the connecting terminal is shaved to enhance the coefficient of friction thereof to enhance the insertion force thereof when the connecting terminal is inserted.

In order to solve such problems, there are known a method for producing a silver-plated product by forming a surface layer of silver on a base material by electroplating in a silver plating solution which contains 80 to 130 g/L of silver, 60 to 130 g/L of potassium cyanide, 30 to 80 mg/L of selenium and 50 to 190 g/L of potassium carbonate (see, e.g., Patent Document 1), and a method for producing a silver-plated product by forming a surface layer of silver on a base material by electroplating in a silver plating solution, which contains 80 to 110 g/L of silver, 70 to 160 g/L of potassium cyanide and 55 to 70 mg/L of selenium, so as to satisfy $(32.6x-300) \leq y \leq (32.6x+200)$ assuming that a product of a concentration of potassium cyanide in the silver plating solution and a current density is y ($g \cdot A/L \cdot dm^2$) and that a liquid temperature of the silver plating solution is x (° C.) (see, e.g., Patent Document 2).

However, the silver-plated products produced by the methods of Patent Documents 1 and 2 have a Vickers hardness HV of 155 or less, so that it is desired to provide a silver-plated product having a higher hardness and excellent wear resistance.

On the other hand, there is a problem in that the grain size of the silver-plating film of a silver-plated product is easily increased by recrystallization, so that the increase of the grain size decreases the hardness of the silver-plated product to deteriorate the wear resistance thereof (see, e.g., Patent Document 3).

In order to improve the wear resistance of such a silver-plated product, there is known a method for improving the hardness of the silver-plated product by causing the silver-plating film thereof to contain an element, such as antimony (see, e.g., Patent Document 4).

PRIOR ART DOCUMENT(S)

Patent Document(s)

Patent Document 1: JP 2016-204719 A (Paragraph Numbers 0010)

Patent Document 2: JP 2016-145413 A (Paragraph Numbers 0010)

Patent Document 3: JP 2008-169408 A (Paragraph Numbers 0006)

Patent Document 4: JP 2009-79250 A (Paragraph Numbers 0003-0004)

SUMMARY OF THE INVENTION

However, if the silver-plating film is caused to contain an element, such as antimony, as the method of Patent Document 4, the improvement of the wear resistance is not sufficient although silver is alloyed to improve the hardness thereof. For that reason, it is desired to provide a silver-plated product having more excellent wear resistance.

It is therefore an object of the present invention to eliminate the aforementioned conventional problems and to provide a silver-plated product having a higher hardness and more excellent wear resistance than those of conventional silver-plated products, and a method for producing the same.

In order to accomplish the aforementioned object, the inventors have diligently studied and found that it is possible to produce a silver-plated product having a higher hardness and more excellent wear resistance than those of conventional silver-plated products, if the silver-plated product is produced by forming a surface layer of silver on a base material by electroplating at a current density in a silver-plating solution which is an aqueous solution containing silver potassium cyanide or silver cyanide, potassium cyanide or sodium cyanide, and a benzimidazole, wherein the ratios of the concentrations of silver potassium cyanide or silver cyanide, potassium cyanide or sodium cyanide, and the benzimidazole to the current density during the silver-plating (or the ratios of the concentrations of silver potassium cyanide or silver cyanide and the benzimidazole to the current density during the silver plating, and the concentration of potassium cyanide or sodium cyanide) are set to be predetermined ranges, respectively. Thus, the inventors have made the present invention.

According to the present invention, there is provided a method for producing a silver-plated product, the method comprising the steps of: preparing a silver-plating solution which is an aqueous solution containing silver potassium cyanide or silver cyanide, potassium cyanide or sodium cyanide, and a benzimidazole, the concentration of potassium cyanide or sodium cyanide being 30 to 80 (g/L); and forming a surface layer of silver on a base material by electroplating at a current density in the silver-plating solution so as to satisfy $A/D \geq 30$ ($g \cdot dm^2/L \cdot A$) (when the silver-plating solution contains silver potassium cyanide) or $A/D \geq 15$ ($g \cdot dm^2/L \cdot A$) (when the silver-plating solution contains silver cyanide) and C/D≥1.2 (g·dm$^2$/L·A) assuming that a concentration of silver potassium cyanide or silver cyanide in the silver-plating solution is A (g/L), that the concentration of potassium cyanide or sodium cyanide in the silver-plating solution is B (g/L), that a concentration of the benzimidazole in the silver-plating solution is C (g/L) and that the current density during the electroplating is D (A/dm$^2$).

According to the present invention, there is also provided a method for producing a silver-plated product, the method comprising the steps of: preparing a silver-plating solution which is an aqueous solution containing silver potassium cyanide or silver cyanide, potassium cyanide or sodium cyanide, and a benzimidazole; and forming a surface layer of silver on a base material by electroplating at a current density in the silver-plating solution so as to satisfy A/D≥30 (g·dm$^2$/L·A) (when the silver-plating solution contains silver potassium cyanide) or A/D≥15 (g·dm$^2$/L·A) (when the silver-plating solution contains silver cyanide), B/D≤100 (g·dm$^2$/L·A) (when the silver-plating solution contains potassium cyanide) or B/D≤150 (g·dm$^2$/L·A) (when the silver-plating solution contains sodium cyanide) and C/D≥1.2 (g·dm$^2$/L·A) assuming that a concentration of silver potassium cyanide or silver cyanide in the silver-plating solution is A (g/L), that a concentration of potassium cyanide or sodium cyanide in the silver-plating solution is B (g/L), that a concentration of the benzimidazole in the silver-plating solution is C (g/L) and that the current density during the electroplating is D (A/dm$^2$). In this method for producing a silver-plated product, the concentration of potassium cyanide or sodium cyanide in the silver-plating solution is preferably 30 to 80 g/L.

In the above-described method for producing a silver-plated product, the benzimidazole is preferably 2-mercaptobenzimidazole or 2-mercaptobenzimidazole sulfonic acid sodium salt dihydrate. The concentration of the benzimidazole in the silver-plating solution is preferably 0.5 to 50 g/L. The silver-plating solution may contain 30 g/L or less of potassium carbonate. The electroplating for forming the surface layer of silver is preferably carried out at a liquid temperature of 10 to 50° C. The electroplating for forming the surface layer of silver is preferably carried out at a current density of 0.2 to 2.0 A/dm$^2$. The base material is preferably made of copper or a copper alloy. Between the base material and the surface layer, an underlying layer of nickel is preferably formed.

According to the present invention, there is provided a silver-plated product comprising: a base material; and a surface layer of silver which is formed on the base material, the surface layer having an average crystallite size of not greater than 25 nm and having a Vickers hardness HV of not less than 150, the content of antimony in the surface layer being 0.1% by weight or less.

In this silver-plated product, the surface layer is preferably made of silver of 90 to 99% by weight. The content of carbon in the surface layer is preferably 1 to 10% by weight. The Vickers hardness HV of the silver-plated product is preferably not less than 160. The base material is preferably made of copper or a copper alloy. Between the base material and the surface layer, an underlying layer of nickel is preferably formed.

According to the present invention, it is possible to provide a silver-plated product having a higher hardness and more excellent wear resistance than those of conventional silver-plated products, and a method for producing the same.

DETAILED DESCRIPTION

In the preferred embodiment of a method for producing a silver-plated product according to the present invention, the silver-plated product is produced by forming a surface layer of silver on a base material by electroplating at a current density in a silver-plating solution which is an aqueous solution containing silver potassium cyanide or silver cyanide, potassium cyanide or sodium cyanide, and a benzimidazole (such as 2-mercaptobenzmimidazole or 2-mercaptobenzimidazole sulfonic acid sodium salt dihydrate), wherein a concentration of potassium cyanide or sodium cyanide in the silver-plating solution is 30 to 80 (g/L) (preferably 35 to 75 g/L, more preferably 35 to 60 g/L), A/D≥30 (g·dm$^2$/L·A) (preferably A/D≥35 (g·dm$^2$/L·A)) (when the silver-plating solution contains silver potassium cyanide) or A/D≥15 (g·dm$^2$/L·A) (preferably A/D≥17 (g·dm$^2$/L·A)) (when the silver-plating solution contains silver cyanide) and C/D≥1.2 (g·dm$^2$/L·A) (preferably C/D≥1.3 (g·dm$^2$/L·A)), or wherein A/D≥30 (g·dm$^2$/L·A) (preferably A/D≥35 (g·dm$^2$/L·A)) (when the silver-plating solution contains silver potassium cyanide) or A/D≥15 (g·dm$^2$/L·A) (preferably A/D≥17 (g·dm$^2$/L·A)) (when the silver-plating solution contains silver cyanide), B/D≤100 (g·dm$^2$/L·A) (preferably B/D≤90 (g·dm$^2$/L·A)) (when the silver-plating solution contains potassium cyanide) or B/D≤150 (g·dm$^2$/L·A) (preferably B/D≤120 (g·dm$^2$/L·A)) (when the silver-plating solution contains sodium cyanide) and C/D≥1.2 (g·dm$^2$/L·A) (preferably C/D≥1.3 (g·dm$^2$/L·A)), assuming that the concentration of silver potassium cyanide or silver cyanide in the silver-plating solution is A (g/L), that the concentration of potassium cyanide or sodium cyanide in the silver-plating solution is B (g/L), that the concentration of the benzimidazole (such as 2-mercaptobenzmimidazole or 2-mercaptobenzimidazole sulfonic acid sodium salt dihydrate) in the silver-plating solution is C (g/L) and that the current density during the electroplating is D (A/dm$^2$). Furthermore, in the latter electroplating, the concentration B of potassium cyanide or sodium cyanide in the silver-plating solution is preferably 30 to 80 g/L. If a benzimidazole (such as 2-mercaptobenzmimidazole or 2-mercaptobenzimidazole sulfonic acid sodium salt dihydrate) is thus added to a (cyanide-containing) silver-plating solution as an organic addition agent to carry out electroplating (silver-plating), it is considered that it is possible to incorporate (at least a part of) the organic addition agent into the surface layer of silver to suppress the crystal grain growth of silver in the surface layer (to miniaturize crystal grains of silver in the surface layer) to enhance the hardness of the surface layer to improve the wear resistance thereof while decreasing the coefficient of friction of the surface layer by the lubricating effect of the organic addition agent. If the organic addition agent is thus incorporated into the surface layer of silver, when the silver-plated product is used as the material of a connecting terminal or like, it is possible to suppress the adhesion due to the insertion and extraction and/or the sliding movement to improve the wear resistance thereof. In particular, if the electroplating is carried out by the above-described conditions, it is possible to produce a silver-plated product having a higher hardness and more excellent wear resistance than those of conventional silver-plated products.

In the above-described method for producing a silver-plated product, the concentration of the benzimidazole in the silver-plating solution is preferably 0.5 to 50 g/L (preferably 0.5 to 5 g/L in the case of 2-mercaptobenzmimidazole, or preferably 10 to 50 g/L (more preferably 15 to 40 g/L) in the case of 2-mercaptobenzimidazole sulfonic acid sodium salt dihydrate). The silver-plating solution may contain 30 g/L or less (preferably 20 g/L or less, more preferably 15 g/L or less) of potassium carbonate. The electroplating for forming the surface layer of silver is preferably carried out at a liquid temperature of 10 to 50° C. and more preferably carried out at a liquid temperature of 15 to 40° C. The electroplating for forming the surface layer of silver is preferably carried out at a current density of 0.2 to 2.0 A/dm$^2$ and more preferably carried out at a current density of 0.3 to 1.7 A/dm$^2$. The base material is preferably made of copper or a copper alloy. Between the base material and the surface layer, an underlying layer (of copper, nickel or an alloy thereof) is preferably formed.

The preferred embodiment of a silver-plated product according to the present invention comprises: a base material; and a surface layer of silver which is formed on the base material, the surface layer having an average crystallite size of not greater than 25 nm (preferably not greater than 24 nm) and having a Vickers hardness HV of not less than 150 (preferably not less than 160, more preferably 165 to 250), the content of antimony in the surface layer being 0.1% by weight or less.

In this silver-plated product, the surface layer is preferably made of silver of 90 to 99% b$_y$ weight, and more preferably made of silver of 92 to 99% by weight. The content of carbon in the surface layer is preferably 1 to 10% by weight, more preferably 2 to 8% by weight and most preferably 3 to 6% by weight. The content of oxygen in the surface layer is preferably not greater than 5% by weight, and more preferably not greater than 3% by weight. The content of potassium in the surface layer is preferably not greater than 1% by weight, and more preferably not greater than 0.8% by weight. The base material is preferably made of copper or a copper alloy. Between the base material and the surface layer, an underlying layer (of copper, nickel or an alloy thereof) is preferably formed.

EXAMPLES

Examples of a silver-plated product and a method for producing the same according to the present invention will be described below in detail.

Example 1

First, a rolled sheet of oxygen-free copper (C1020 ½H) having a size of 67 mm×50 mm×0.3 mm was prepared as a base material (a material to be plated). As the pretreatment of the material, the material and a SUS plate were put in an alkali degreasing solution to be used as a cathode and an anode, respectively, to carry out electrolytic degreasing at 5 V for 30 seconds. The material thus electrolytic-degreased was washed with water, and then, pickled for 15 seconds in a 3% sulfuric acid.

Then, the material thus pretreated and a nickel electrode plate were used as a cathode and an anode, respectively, to electroplate (dull-nickel-plate) the material at a liquid temperature of 55° C. and at a current density of 5 A/dm$^2$ for 80 seconds in an aqueous dull-nickel-plating solution containing 540 g/L of nickel sulfamate tetrahydrate, 25 g/L of nickel chloride and 35 g/L of boric acid, while stirring the solution at 500 rpm by means of a stirrer. After a dull-nickel-plating film was thus formed as an underlying plating film, the thickness of the substantially central portion of the dull-nickel-plating film was measured by means of an X-ray fluorescent analysis thickness meter (SFT-110A produced by Hitachi High-Tech Science Corporation). As a result, the thickness was 1 μm.

Then, the material having the underlying plating film and a titanium electrode plate coated with platinum were used as a cathode and an anode, respectively, to electroplate the material at a room temperature (25° C.) and at a current density of 2.0 A/dm$^2$ for 10 seconds in an aqueous silver strike plating solution containing 3 g/L of silver potassium cyanide ($KAg(CN)_2$) and 90 g/L of potassium cyanide (KCN), while stirring the solution at 500 rpm by means of a stirrer. After a silver strike plating film was thus formed, the silver-strike-plated material was washed with water for sufficiently washing away the silver strike plating solution.

Then, the silver-strike-plated material and a silver electrode plate were used as a cathode and an anode, respectively, to electroplate (silver-plate) the material at a liquid temperature of 25° C. and at a current density of 0.5 A/dm$^2$ for 18 minutes in an aqueous silver-plating solution containing 40 g/L of silver potassium cyanide ($KAg(CN)_2$), 39 g/L of potassium cyanide (KCN) and 1 g/L of 2-mercaptobenzimidazole (2-MBI), while stirring the solution at 500 rpm by means of a stirrer. The silver-plating film thus formed was washed with water, and then, dried with wind pressure by means of an air gun to obtain a silver-plated product. The thickness of the substantially central portion of the silver-plating film of the silver-plated product was measured by means of the above-described X-ray fluorescent analysis thickness meter. As a result, the thickness was 5 μm. Furthermore, assuming that the concentrations of silver potassium cyanide ($KAg(CN)_2$), potassium cyanide (KCN) and 2-mercaptobenzmimidazole (2-MBI) in the silver-plating solution during the formation of the silver-plating film of the silver-plated product were A (g/L), B (g/L) and C (g/L), respectively and that the current density during the electroplating was D (A/dm$^2$), A/D=80 (g·dm$^2$/L·A), B/D =78 (g·dm$^2$/L·A) and C/D =2.0 (g·dm$^2$/L·A).

The Vickers hardness HV of the silver-plated product thus obtained was measured in accordance with JIS Z2244 by applying a measuring load of 10 gf for 10 seconds using a micro-hardness testing machine (HM-221 produced by Mitutoyo Corporation). As a result, the Vickers hardness HV was 171.1.

Two silver-plated products, each of which was the same as the above-described silver-plated product, were prepared, one of the silver-plated products being indented (Inside R=1.5 mm) to be used as an indenter, and the other of the silver-plated products being used as a plate-shaped evaluation sample. Then, the wear resistance of the evaluation sample was evaluated by carrying out an abrasion test for confirming the abrasion status of the evaluation sample by observing the central portion of the sliding scratch of the evaluation sample at a magnification of 100 by means of a microscope (VHX-1000 produced by Keyence Corporation) when the reciprocating sliding movement (sliding distance=5 mm, sliding speed=1.67 mm/s) was continued until the base material was exposed while the indenter was pushed against the evaluation sample at a constant load (5N) by means of a precision sliding testing apparatus (CRS-G2050-DWA produced by Yamasaki-Seiki Laboratory Co., Ltd.). As a result, it was confirmed that the base material was not exposed after the reciprocating sliding movement was repeated 1,000 times, so that it was found that the wear resistance thereof was good. Before and after the sliding abrasion test, the contact resistance of the evaluation sample was measured at a measuring current of 10 mA while the indenter was pushed against the evaluation sample at a constant load (5N). As a result, the initial contact resistance before the sliding test was 0.32 mΩ, and the contact resistance after the sliding test was 0.13 mΩ.

The crystallite sizes in vertical directions to each crystal plane of (111), (200), (220) and (311) planes of the silver-plating film of the silver-plated product were calculated by the Scherrer's equation from the full-width at half maximum of each of peaks ((111) peak appearing at about 38°, (200) peak appearing at about 44°, (220) peak appearing at about 64° and (311) peak appearing at about)77° on the crystal planes on an X-ray diffraction pattern (XRD pattern) obtained by means of an X-ray diffractometer (Full-Automatic Multi-Purpose Horizontal X-ray diffractometer, Smart Lab produced by RIGAKU Corporation). The calculated crystallite sizes were weighted on the basis of the orientation ratio of each of the crystal planes to calculate an average crystallite size by the weighted average of the crystallite sizes on the crystal planes. As a result, the average crystallite size of the silver-plating film was 127.78 angstrom (12.778 nm). Furthermore, as the above-described orientation ratio, there was used a value (corrected intensity) which was corrected by dividing each of the X-ray diffraction peak intensities (the intensities at X-ray diffraction peaks) on the (111), (200), (220) and (311) planes of the silver-plating film by each of the relative intensity ratios (the relative intensity ratios during the measurement of powder) described on JCPDS card No.40783 ((111):(200):(220):(311)=100:40:25:26), the X-ray diffraction peak intensities being obtained from the X-ray diffraction pattern obtained by scanning in a scanning field 2θ/θ using a Cu tube and a K β filter method by means of an X-ray diffractometer (XRD) (Full-Automatic Multi-Purpose Horizontal X-ray diffractometer, Smart Lab produced by RIGAKU Corporation).

The surface analysis of the silver-plating film of the silver-plated product was carried out by the quantitative analysis based on the ZAP method, at an applied voltage of 15 kV and at an illumination current of $3.0\times10^{-8}$ A in an analysis area of 50 μm square by means of an electron probe microanalyzer (EPMA) (JXA8200 produced by JEOL Ltd.). As a result, the silver-plating film was a film containing 4.1% by weight of carbon, 2.7% by weight of oxygen, 0.6% by weight of potassium and the balance being silver. Other elements (such as antimony and tin) were not detected in the silver-plating film, and the contents thereof were less than 0.1% by weight.

Example 2

A silver-plated product was produced by the same method as that in Example 1, except that the electroplating (silver-plating) for forming the silver-plating film was carried out at a current density of 0.7 A/dm$^2$ for 13 minutes. The thickness of the substantially central portion of the silver-plating film of the silver-plated product was measured by the same method as that in Example 1, so that the thickness was 5 μm. Furthermore, in the formation of the silver-plating film of the silver-plated product, A/D=57 (g·dm$^2$/L·A), B/D=56 (g·dm$^2$/L·A) and C/D=1.4 (g·dm$^2$/L·A).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 187.7. It was confirmed that the base material was not exposed after the reciprocating sliding movement was repeated 1,000 times, so that it was found that the wear resistance thereof was good. The average crystallite size of the silver-plating film was 147.34 angstrom (14.734 nm).

The surface analysis of the silver-plating film of the silver-plated product was carried out by the same method as that in Example 1, so that the silver-plating film was a film containing 3.6% by weight of carbon and the balance being silver. Other elements (such as antimony and tin) were not detected in the silver-plating film, and the contents thereof were less than 0.1% by weight.

Example 3

A silver-plated product was produced by the same method as that in Example 1, except that the amount of 2-mercaptobenzmimidazole (2-MBI) in the silver-plating solution was 2 g/L. The thickness of the substantially central portion of the silver-plating film of the silver-plated product was measured by the same method as that in Example 1, so that the thickness was 5 μm. Furthermore, in the formation of the silver-plating film of the silver-plated product, A/D=80 (g·dm$^2$/L·A), B/D=78 (g·dm$^2$/L·A) and C/D=4.0 (g·dm$^2$/L·A).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 165.6.

It was confirmed that the base material was not exposed after the reciprocating sliding movement was repeated 1,000 times, so that it was found that the wear resistance thereof was good. The average crystallite size of the silver-plating film was 143.70 angstrom (14.370 nm).

The surface analysis of the silver-plating film of the silver-plated product was carried out by the same method as that in Example 1. As a result, the silver-plating film was a film containing 5.3% by weight of carbon, 0.6% by weight of sulfur and the balance being silver. Other elements (such as antimony and tin) were not detected in the silver-plating film, and the contents thereof were less than 0.1% by weight.

Example 4

A silver-plated product was produced by the same method as that in Example 1, except that the amount of silver potassium cyanide ($KAg(CN)_2$) in the silver-plating solution was 100 g/L. The thickness of the substantially central portion of the silver-plating film of the silver-plated product was measured by the same method as that in Example 1, so that the thickness was 5 μm. Furthermore, in the formation of the silver-plating film of the silver-plated product, A/D=200 (g dm$^2$/L·A), B/D=78 (g·dm$^2$/L·A) and C/D=2.0 (g·dm$^2$/L·A).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 181.2. It was confirmed that the base material was not exposed after the reciprocating sliding movement was repeated 1,000 times, so that it was found that the wear resistance thereof was good. The average crystallite size of the silver-plating film was 231.46 angstrom (23.146 nm).

Example 5

A silver-plated product was produced by the same method as that in Example 1, except that the amount of silver potassium cyanide ($KAg(CN)_2$) in the silver-plating solution was 100 g/L, that the amount of 2-mercaptobenzmimidazole (2-MBI) in the silver-plating solution was 2 g/L and that the electroplating (silver-plating) was carried out at a current density of 1.5 A/dm$^2$ for 6 minutes. The thickness of the substantially central portion of the silver-plating film of the silver-plated product was measured by the same method as that in Example 1, so that the thickness was 5 μm. Furthermore, in the formation of the silver-plating film of the silver-plated product, A/D=67 (g·dm$^2$/L·A), B/D=26 (g·dm$^2$/L·A) and C/D=1.3 (g·dm$^2$/L·A).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 165.5. It was confirmed that the base material was not exposed after the reciprocating sliding movement was repeated 1,000 times, so that it was found that the wear resistance thereof was good. The average crystallite size of the silver-plating film was 100.15 angstrom (10.015 nm).

Example 6

A silver-plated product was produced by the same method as that in Example 1, except that an aqueous silver-plating solution containing 40 g/L of silver potassium cyanide ($KAg(CN)_2$), 39 g/L of potassium cyanide (KCN), 1 g/L of 2-mercaptobenzimidazole (2-MBI) and 20 g/L of potassium carbonate ($K_2CO_3$) was used as the silver-plating solution. The thickness of the substantially central portion of the silver-plating film of the silver-plated product was measured by the same method as that in Example 1, so that the thickness was 5 μm. Furthermore, in the formation of the silver-plating film of the silver-plated product, A/D=80 (g·dm$^2$/L·A) , B/D=78 (g·dm$^2$/L·A) and C/D=2.0 (g·dm$^2$/L·A).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 188.6. It was confirmed that the base material was not exposed after the reciprocating sliding movement was repeated 1,000 times, so that it was found that the wear resistance thereof was good. The average crystallite size of the silver-plating film was 166.07 angstrom (16.607 nm).

Example 7

A silver-plated product was produced by the same method as that in Example 1, except that the dull-nickel-plating film was not formed. The thickness of the substantially central portion of the silver-plating film of the silver-plated product was measured by the same method as that in Example 1, so that the thickness was 5 μm. Furthermore, in the formation of the silver-plating film of the silver-plated product, A/D=80 (g·dm$^2$/L·A), B/D=78 (g·dm$^2$/L·A) and C/D=2.0 (g·dm$^2$/L·A).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 175.7. It was confirmed that the base material was not exposed after the reciprocating sliding movement was repeated 1,000 times, so that it was found that the wear resistance thereof was good. The average crystallite size of the silver-plating film was 156.82 angstrom (15.682 nm).

Example 8

A silver-plated product was produced by the same method as that in Example 7, except that the electroplating (silver-plating) for forming the silver-plating film was carried out at a current density of 1 A/dm$^2$ for 9 minutes. The thickness of the substantially central portion of the silver-plating film of the silver-plated product was measured by the same method as that in Example 1, so that the thickness was 5 μm. Furthermore, in the formation of the silver-plating film of the silver-plated product, A/D=40 (g·dm$^2$/L·A), B/D=39 (g·dm$^2$/L·A) and C/D=2.0 (g·dm$^2$/L·A).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 170.4. It was confirmed that the base material was not exposed after the reciprocating sliding movement was repeated 1,000 times, so that it was found that the wear resistance thereof was good. The average crystallite size of the silver-plating film was 156.82 angstrom (15.682 nm).

Example 9

A silver-plated product was produced by the same method as that in Example 1, except that the electroplating (silver-plating) for forming the silver-plating film was carried out at a liquid temperature of 18° C. The thickness of the substantially central portion of the silver-plating film of the silver-plated product was measured by the same method as that in Example 1, so that the thickness was 5 μm. Furthermore, in the formation of the silver-plating film of the silver-plated product, A/D=80 (g·dm$^2$/L·A) , B/D=78 (g·dm$^2$/L·A) and C/D=2.0 (g·dm$^2$/L·A).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 194.1. It was confirmed that the base material was not exposed after the reciprocating sliding movement was repeated 1,000 times, so that it was found that the wear resistance thereof was good. The average crystallite size of the silver-plating film was 105.03 angstrom (10.503 nm).

Example 10

A silver-plated product was produced by the same method as that in Example 1, except that the electroplating (silver-plating) for forming the silver-plating film was carried out at a liquid temperature of 35° C. The thickness of the substantially central portion of the silver-plating film of the silver-plated product was measured by the same method as that in Example 1, so that the thickness was 5 μm. Furthermore, in the formation of the silver-plating film of the silver-plated product, A/D=80 (g·dm$^2$/L·A) , B/D=78 (g·dm$^2$/L·A) and C/D=2.0 (g·dm$^2$/L·A).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 185.8. It was confirmed that the base material was not exposed after the reciprocating sliding movement was repeated 1,000 times, so that it was found that the wear resistance thereof was good. The average crystallite size of the silver-plating film was 168.56 angstrom (16.856 nm).

Example 11

A silver-plated product was produced by the same method as that in Example 3, except that the electroplating time for forming the silver-plating film was 7.2 minutes. The thickness of the substantially central portion of the silver-plating film of the silver-plated product was measured by the same method as that in Example 1, so that the thickness was 2 μm. Furthermore, in the formation of the silver-plating film of the silver-plated product, A/D=80 ($g \cdot dm^2/L \cdot A$), B/D=78 ($g \cdot dm^2/L \cdot A$) and C/D=4.0 ($g \cdot dm^2/L \cdot A$).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 154.3. It was confirmed that the base material was not exposed after the reciprocating sliding movement was repeated 800 times, so that it was found that the wear resistance thereof was good. The average crystallite size of the silver-plating film was 209.40 angstrom (20.940 nm).

Comparative Example 1

A silver-plated product was produced by the same method as that in Example 1, except that an aqueous silver-plating solution containing 40 g/L of silver potassium cyanide ($KAg(CN)_2$) and 39 g/L of potassium cyanide (KCN) was used as the silver-plating solution. The thickness of the substantially central portion of the silver-plating film of the silver-plated product was measured by the same method as that in Example 1, so that the thickness was 5 μm. Furthermore, in the formation of the silver-plating film of the silver-plated product, A/D=80 ($g \cdot dm^2/L \cdot A$), B/D=78 ($g \cdot dm^2/L \cdot A$) and C/D=0 ($g \cdot dm^2/L \cdot A$).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 105.8. It was confirmed that the base material was exposed after the reciprocating sliding movement was repeated 60 times, so that it was found that the wear resistance thereof was not good. The average crystallite size of the silver-plating film was 434.98 angstrom (43.498 nm).

Comparative Example 2

A silver-plated product was produced by the same method as that in Comparative Example 1, except that the electroplating (silver-plating) for forming the silver-plating film was carried out at a current density of 1.5 $A/dm^2$ for 6 minutes. The thickness of the substantially central portion of the silver-plating film of the silver-plated product was measured by the same method as that in Example 1, so that the thickness was 5 μm. Furthermore, in the formation of the silver-plating film of the silver-plated product, A/D=27 ($g \cdot dm^2/L \cdot A$), B/D=26 ($g \cdot dm^2/L \cdot A$) and C/D=0 ($g \cdot dm^2/L \cdot A$).

With respect to the silver-plated product thus obtained, the measurement of the Vickers hardness HV of the silver-plating film and the calculation of the crystallite sizes thereof were carried out by the same methods as those in Example 1. As a result, the Vickers hardness HV was 112.7, and the average crystallite size of the silver-plating film was 625.39 angstrom (62.539 nm). Furthermore, the sliding abrasion test for the silver-plated product was not carried out since uneven appearance was observed on the surface of the silver-plating film.

Comparative Example 3

A silver-plated product was produced by the same method as that in Example 1, except that the electroplating (silver-plating) for forming the silver-plating film was carried out at a current density of 1 $A/dm^2$ for 9 minutes. The thickness of the substantially central portion of the silver-plating film of the silver-plated product was measured by the same method as that in Example 1, so that the thickness was 5 μm. Furthermore, in the formation of the silver-plating film of the silver-plated product, A/D=40 ($g \cdot dm^2/L \cdot A$), B/D=39 ($g \cdot dm^2/L \cdot A$) and C/D=1.0 ($g \cdot dm^2/L \cdot A$).

With respect to the silver-plated product thus obtained, the measurement of the Vickers hardness HV of the silver-plating film and the calculation of the crystallite sizes thereof were carried out by the same methods as those in Example 1. As a result, the Vickers hardness HV was 131.2, and the average crystallite size of the silver-plating film was 160.06 angstrom (16.006 nm). Furthermore, the sliding abrasion test for the silver-plated product was not carried out since uneven appearance was observed on the surface of the silver-plating film.

Comparative Example 4

A silver-plated product was produced by the same method as that in Example 3, except that the electroplating (silver-plating) for forming the silver-plating film was carried out at a current density of 1.5 $A/dm^2$ for 6 minutes. The thickness of the substantially central portion of the silver-plating film of the silver-plated product was measured by the same method as that in Example 1, so that the thickness was 5 μm. Furthermore, in the formation of the silver-plating film of the silver-plated product, A/D=27 ($g \cdot dm^2/L \cdot A$), B/D=26 ($g \cdot dm^2/L \cdot A$) and C/D=1.3 ($g \cdot dm^2/L \cdot A$).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 131.1. It was confirmed that the base material was exposed after the reciprocating sliding movement was repeated 100 times, so that it was found that the wear resistance thereof was not good. The average crystallite size of the silver-plating film was 105.20 angstrom (10.520 nm).

Comparative Example 5

A silver-plated product was produced by the same method as that in Example 1, except that the amount of potassium cyanide (KCN) in the silver-plating solution was 99 g/L and that the electroplating (silver-plating) was carried out at a current density of 1.5 $A/dm^2$ for 6 minutes. The thickness of the substantially central portion of the silver-plating film of the silver-plated product was measured by the same method as that in Example 1, so that the thickness was 5 μm. Furthermore, in the formation of the silver-plating film of the silver-plated product, A/D=27 ($g \cdot dm^2/L \cdot A$), B/D=66 ($g \cdot dm^2/L \cdot A$) and C/D=0.7 ($g \cdot dm^2/L \cdot A$).

With respect to the silver-plated product thus obtained, the measurement of the Vickers hardness HV of the silver-plating film and the calculation of the crystallite sizes thereof were carried out by the same methods as those in Example 1. As a result, the Vickers hardness HV was 118.6, and the average crystallite size of the silver-plating film was 318.16 angstrom (31.816 nm). Furthermore, the sliding abrasion test for the silver-plated product was not carried out since uneven appearance was observed on the surface of the silver-plating film.

Comparative Example 6

A silver-plated product was produced by the same method as that in Example 3, except that the amount of potassium cyanide (KCN) in the silver-plating solution was 99 g/L. The thickness of the substantially central portion of the silver-plating film of the silver-plated product was measured by the same method as that in Example 1, so that the thickness was 5 μm. Furthermore, in the formation of the silver-plating film of the silver-plated product, A/D=80 ($g \cdot dm^2/L \cdot A$) , B/D=198 ($g \cdot dm^2/L \cdot A$) and C/D=4.0 ($g \cdot dm^2/L \cdot A$).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 121.3. It was confirmed that the base material was exposed after the reciprocating sliding movement was repeated 80 times, so that it was found that the wear resistance thereof was not good. The average crystallite size of the silver-plating film was 736.65 angstrom (73.665 nm).

Comparative Example 7

A silver-plated product was produced by the same method as that in Example 4, except that the electroplating (silver-plating) for forming the silver-plating film was carried out at a current density of 1 $A/dm^2$ for 9 minutes. The thickness of the substantially central portion of the silver-plating film of the silver-plated product was measured by the same method as that in Example 1, so that the thickness was 5 μm. Furthermore, in the formation of the silver-plating film of the silver-plated product, A/D=100 ($g \cdot dm^2/L \cdot A$), B/D=39 ($g \cdot dm^2/L \cdot A$) and C/D=1.0 ($g \cdot dm^2/L \cdot A$).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 138.4. It was confirmed that the base material was exposed after the reciprocating sliding movement was repeated 200 times, so that it was found that the wear resistance thereof was not good. The average crystallite size of the silver-plating film was 205.78 angstrom (20.578 nm).

Comparative Example 8

A silver-plated product was produced by the same method as that in Example 4, except that the electroplating (silver-plating) for forming the silver-plating film was carried out at a current density of 1.5 $A/dm^2$ for 6 minutes. The thickness of the substantially central portion of the silver-plating film of the silver-plated product was measured by the same method as that in Example 1, so that the thickness was 5 μm. Furthermore, in the formation of the silver-plating film of the silver-plated product, A/D=67 ($g \cdot dm^2/L \cdot A$), B/D=26 ($g \cdot dm^2/L \cdot A$) and C/D=0.7 ($g \cdot dm^2/L \cdot A$).

With respect to the silver-plated product thus obtained, the measurement of the Vickers hardness HV of the silver-plating film and the calculation of the crystallite sizes thereof were carried out by the same methods as those in Example 1. As a result, the Vickers hardness HV was 130.8, and the average crystallite size of the silver-plating film was 318.46 angstrom (31.846 nm). Furthermore, the sliding abrasion test for the silver-plated product was not carried out since uneven appearance was observed on the surface of the silver-plating film.

Comparative Example 9

A silver-plated product was produced by the same method as that in Example 1, except that the electroplating (silver-plating) was carried out at a current density of 1.5 $A/dm^2$ for 6 minutes in an aqueous silver-plating solution containing 100 g/L of silver potassium cyanide ($KAg(CN)_2$), 99 g/L of potassium cyanide (KCN) and 1 g/L of 2-mercaptobenzmimidazole (2-MBI). The thickness of the substantially central portion of the silver-plating film of the silver-plated product was measured by the same method as that in Example 1, so that the thickness was 5 μm. Furthermore, in the formation of the silver-plating film of the silver-plated product, A/D=67 ($g \cdot dm^2/L \cdot A$) , B/D=66 ($g \cdot dm^2/L \cdot A$) and C/D=0.7 ($g \cdot dm^2/L \cdot A$).

With respect to the silver-plated product thus obtained, the measurement of the Vickers hardness HV of the silver-plating film and the calculation of the crystallite sizes thereof were carried out by the same methods as those in Example 1. As a result, the Vickers hardness HV was 120.1, and the average crystallite size of the silver-plating film was 381.93 angstrom (38.193 nm). Furthermore, the sliding abrasion test was not carried out since uneven appearance was observed on the surface of the silver-plating film.

Comparative Example 10

A silver-plated product was produced by the same method as that in Example 3, except that the amounts of silver potassium cyanide ($KAg(CN)_2$) and potassium cyanide (KCN) in the silver-plating solution were 100 g/L and 99 g/L, respectively. The thickness of the substantially central portion of the silver-plating film of the silver-plated product was measured by the same method as that in Example 1, so that the thickness was 5 μm. Furthermore, in the formation of the silver-plating film of the silver-plated product, A/D=200 ($g \cdot dm^2/L \cdot A$), B/D=198 ($g \cdot dm^2/L \cdot A$) and C/D=4.0 ($g \cdot dm^2/L \cdot A$).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 121.4. It was confirmed that the base material was exposed after the reciprocating sliding movement was repeated 70 times, so that it was found that the wear resistance thereof was not good. The average crystallite size of the silver-plating film was 391.48 angstrom (39.148 nm).

Comparative Example 11

A silver-plated product was produced by the same method as that in Example 1, except that the electroplating (silver-plating) was carried out at a current density of 2 A/dm$^2$ for 5 minutes in an aqueous silver-plating solution containing 115 g/L of silver potassium cyanide ($KAg(CN)_2$), 60 g/L of potassium cyanide (KCN) and 40 mg/L of selenium. The thickness of the substantially central portion of the silver-plating film of the silver-plated product was measured by the same method as that in Example 1, so that the thickness was 5 μm. Furthermore, in the formation of the silver-plating film of the silver-plated product, A/D=58 (g·dm$^2$/L·A), B/D=30 (g·dm$^2$/L·A) and C/D=0 (g·dm$^2$/L·A).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 118.9.

It was confirmed that the base material was exposed after the reciprocating sliding movement was repeated 100 times, so that it was found that the wear resistance thereof was not good. The average crystallite size of the silver-plating film was 635.73 angstrom (63.573 nm).

Comparative Example 12

A silver-plated product was produced by the same method as that in Example 1, except that the electroplating (silver-plating) was carried out at a liquid temperature of 16° C. and at a current density of 8 A/dm$^2$ for 80 seconds (1.3 minutes) in an aqueous silver-plating solution containing 148 g/L of silver potassium cyanide ($KAg(CN)_2$), 140 g/L of potassium cyanide (KCN) and 8 mg/L of selenium. The thickness of the substantially central portion of the silver-plating film of the silver-plated product was measured by the same method as that in Example 1, so that the thickness was 5 μm. Furthermore, in the formation of the silver-plating film of the silver-plated product, A/D=19 (g·dm$^2$/L·A), B/D=18 (g·dm$^2$/L·A) and C/D=0 (g·dm$^2$/L·A).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 82.4. It was confirmed that the base material was exposed after the reciprocating sliding movement was repeated 50 times, so that it was found that the wear resistance thereof was not good. The average crystallite size of the silver-plating film was 749.72 angstrom (74.972 nm).

Comparative Example 13

A silver-plated product was produced by the same method as that in Example 1, except that the electroplating (silver-plating) was carried out at a liquid temperature of 18° C. and at a current density of 5 A/dm$^2$ for 2 minutes in an aqueous silver-plating solution containing 175 g/L of silver potassium cyanide ($KAg(CN)^2$), 95 g/L of potassium cyanide (KCN) and 70 mg/L of selenium. The thickness of the substantially central portion of the silver-plating film of the silver-plated product was measured by the same method as that in Example 1, so that the thickness was 5 μm. Furthermore, in the formation of the silver-plating film of the silver-plated product, A/D=35 (g·dm$^2$/L·A), B/D=19 (g·dm$^2$/L·A) and C/D=0 (g·dm$^2$/L·A).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 133.8. It was confirmed that the base material was exposed after the reciprocating sliding movement was repeated 80 times, so that it was found that the wear resistance thereof was not good. The average crystallite size of the silver-plating film was 278.25 angstrom (27.825 nm).

Comparative Example 14

A silver-plated product was produced by the same method as that in Example 1, except that the electroplating (silver-plating) was carried out at a current density of 1 A/dm$^2$ for 9 minutes in an aqueous silver-plating solution containing 40 g/L of silver potassium cyanide ($KAg(CN)_2$), 39 g/L of potassium cyanide (KCN), 1 g/L of 2-mercaptobenzmimidazole (2-MBI) and 20 g/L of potassium carbonate ($K_2CO_3$). The thickness of the substantially central portion of the silver-plating film of the silver-plated product was measured by the same method as that in Example 1, so that the thickness was 5 μm. Furthermore, in the formation of the silver-plating film of the silver-plated product, A/D=40 (g·dm$^2$/L·A), B/D=39 (g·dm$^2$/L·A) and C/D=1.0 (g·dm$^2$/L·A).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 134.4. It was confirmed that the base material was exposed after the reciprocating sliding movement was repeated times of less than 10, so that it was found that the wear resistance thereof was not good. The average crystallite size of the silver-plating film was 192.83 angstrom (19.283 nm).

Comparative Example 15

A silver-plated product was produced by the same method as that in Example 1, except that the dull-nickel-plating film was formed by electroplating at a liquid temperature of 50° C. and at a current density of 4 A/dm$^2$ for 140 seconds, that the silver strike plating film was formed by electroplating at a current density of 2.0 A/dm$^2$ for 30 second and that the silver-plating film was formed by electroplating (silver-plating) at a liquid temperature of 18° C. and at a current density of 3 A/dm$^2$ for 500 seconds (8.3 minutes) in an Ag—Sb plating solution (a plating solution prepared by adding Nissin Bright N (produced by Nissin Kasei Co., Ltd.) to a silver-plating solution (Na bath) produced by Nissin Kasei Co., Ltd.). The thickness of the substantially central portion of the dull-nickel-plating film of the silver-plated product was measured by the same method as that in Example 1, so that the thickness was 1 μm. The thickness of the substantially central portion of the silver-plating film of the silver-plated product was measured by the same method as that in Example 1, so that the thickness was 5 μm.

Furthermore, in the formation of the silver-plating film of the silver-plated product, B/D=0 ($g \cdot dm^2/L \cdot A$) and C/D=0 ($g \cdot dm^2/L \cdot A$).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 170.4. It was confirmed that the base material was exposed after the reciprocating sliding movement was repeated 150 times, so that it was found that the wear resistance thereof was not good. The average crystallite size of the silver-plating film was 126.11 angstrom (12.611 nm).

The surface analysis of the silver-plating film of the silver-plated product was carried out by the same method as that in Example 1. As a result, the silver-plating film was a film containing 1.6% by weight of carbon, 2.9% by weight of antimony and the balance being silver.

Example 12

A silver-plated product was produced by the same method as that in Example 1, except that an aqueous silver-plating solution containing 100 g/L of silver potassium cyanide ($KAg(CN)^2$), 39 g/L of potassium cyanide (KCN) and 20 g/L of 2-mercaptobenzimidazole sulfonic acid sodium salt dihydrate (2-MBIS) was used as the silver-plating solution and that the electroplating (silver-plating) was carried out at a current density of 0.7 $A/dm^2$ for 13 minutes. The thickness of the substantially central portion of the silver-plating film of the silver-plated product was measured by the same method as that in Example 1, so that the thickness was 5 μm. Furthermore, assuming that the concentrations of silver potassium cyanide ($KAg(CN)^2$), potassium cyanide (KCN) and 2-mercaptobenzimidazole sulfonic acid sodium salt dihydrate (2-MBIS) in the silver-plating solution for forming the silver-plating film of the silver-plated product were A (g/L), B (g/L) and C (g/L), respectively and that the current density during the electroplating was D ($A/dm^2$), A/D=143 ($g \cdot dm^2/L \cdot A$), B/D=56 ($g \cdot dm^2/L \cdot A$) and C/D=28.6 ($g \cdot dm^2/L \cdot A$).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 226. It was confirmed that the base material was not exposed after the reciprocating sliding movement was repeated 1,000 times, so that it was found that the wear resistance thereof was good. The average crystallite size of the silver-plating film was 97 angstrom (9.7 nm).

Example 13

A silver-plated product was produced by the same method as that in Example 12, except that the electroplating (silver-plating) for forming the silver-plating film was carried out at a current density of 1.0 $A/dm^2$ for 9 minutes. The thickness of the substantially central portion of the silver-plating film of the silver-plated product was measured by the same method as that in Example 1, so that the thickness was 5 μm. Furthermore, in the formation of the silver-plating film of the silver-plated product, A/D=100 ($g \cdot dm^2/L \cdot A$), B/D=39 ($g \cdot dm^2/L \cdot A$) and C/D=20.0 ($g \cdot dm^2/L \cdot A$).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 175. It was confirmed that the base material was not exposed after the reciprocating sliding movement was repeated 1,000 times, so that it was found that the wear resistance thereof was good. The average crystallite size of the silver-plating film was 112 angstrom (11.2 nm).

Example 14

A silver-plated product was produced by the same method as that in Example 12, except that the electroplating (silver-plating) for forming the silver-plating film was carried out at a current density of 1.5 $A/dm^2$ for 6 minutes. The thickness of the substantially central portion of the silver-plating film of the silver-plated product was measured by the same method as that in Example 1, so that the thickness was 5 μm. Furthermore, in the formation of the silver-plating film of the silver-plated product, A/D=67 ($g \cdot dm^2/L \cdot A$), B/D=26 ($g \cdot dm^2/L \cdot A$) and C/D=13.3 ($g \cdot dm^2/L \cdot A$).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 155. It was confirmed that the base material was not exposed after the reciprocating sliding movement was repeated 500 times, so that it was found that the wear resistance thereof was good. The average crystallite size of the silver-plating film was 138 angstrom (13.8 nm).

Example 15

A silver-plated product was produced by the same method as that in Example 1, except that an aqueous silver-plating solution containing 27 g/L of silver cyanide (AgCN), 39 g/L of sodium cyanide (NaCN) and 1 g/L of 2-mercaptobenzimidazole (2-MBI) was used as the silver-plating solution and that the electroplating (silver-plating) was carried out at a current density of 0.5 $A/dm^2$ for 18 minutes. The thickness of the substantially central portion of the silver-plating film of the silver-plated product was measured by the same method as that in Example 1, so that the thickness was 5 μm. Furthermore, assuming that the concentrations of silver cyanide (AgCN), sodium cyanide (NaCN) and 2-mercaptobenzimidazole (2-MBI) in the silver-plating solution for forming the silver-plating film of the silver-plated product were A (g/L), B (g/L) and C (g/L), respectively and that the current density during the electroplating was D ($A/dm^2$), A/D=54 ($g \cdot dm^2/L \cdot A$), B/D=78 ($g \cdot dm^2/L \cdot A$) and C/D=2.0 ($g \cdot dm^2/L \cdot A$).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 166. It was confirmed that the base material was not exposed after the reciprocating sliding movement was repeated 1,000 times, so that it was found that the wear resistance thereof was good. The average crystallite size of the silver-plating film was 90 angstrom (9.0 nm).

The surface analysis of the silver-plating film of the silver-plated product was carried out by the same method as that in Example 1. As a result, the silver-plating film was a film containing 6.1% by weight of carbon, 1.1% by weight of sulfur and the balance being silver. Other elements (such as antimony and tin) were not detected in the silver-plating film.

Example 16

A silver-plated product was produced by the same method as that in Example 15, except that the electroplating (silver-plating) for forming the silver-plating film was carried out at a current density of 0.7 A/$dm^2$ for 13 minutes. The thickness of the substantially central portion of the silver-plating film of the silver-plated product was measured by the same method as that in Example 1, so that the thickness was 5 μm. Furthermore, in the formation of the silver-plating film of the silver-plated product, A/D=39 (g·$dm^2$/L·A), B/D=56 (g·$dm^2$/L·A) and C/D=1.4 (g·$dm^2$/L·A).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 176. It was confirmed that the base material was not exposed after the reciprocating sliding movement was repeated 1,000 times, so that it was found that the wear resistance thereof was good. The average crystallite size of the silver-plating film was 81 angstrom (8.1 nm).

Example 17

A silver-plated product was produced by the same method as that in Example 15, except that the electroplating (silver-plating) for forming the silver-plating film was carried out at a liquid temperature of 35° C. and at a current density of 0.5 A/$dm^2$ for 18 minutes. The thickness of the substantially central portion of the silver-plating film of the silver-plated product was measured by the same method as that in Example 1, so that the thickness was 5 μm. Furthermore, in the formation of the silver-plating film of the silver-plated product, A/D=54 (g·$dm^2$/L·A) , B/D=78 (g·$dm^2$/L·A) and C/D=2.0 (g·$dm^2$/L·A).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 175. It was confirmed that the base material was not exposed after the reciprocating sliding movement was repeated 1,000 times, so that it was found that the wear resistance thereof was good. The average crystallite size of the silver-plating film was 109 angstrom (10.9 nm).

Example 18

A silver-plated product was produced by the same method as that in Example 15, except that the amount of 2-mercaptobenzmimidazole (2-MBI) in the silver-plating solution was 2 g/L and that the electroplating (silver-plating) for forming the silver-plating film was carried out at a current density of 1.5 A/$dm^2$ for 6 minutes. The thickness of the substantially central portion of the silver-plating film of the silver-plated product was measured by the same method as that in Example 1, so that the thickness was 5 μm. Furthermore, in the formation of the silver-plating film of the silver-plated product, A/D=18 (g·$dm^2$/L·A) , B/D=26 (g·$dm^2$/L·A) and C/D=1.3 (g·$dm^2$/L·A).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 152. It was confirmed that the base material was not exposed after the reciprocating sliding movement was repeated 1,000 times, so that it was found that the wear resistance thereof was good. The average crystallite size of the silver-plating film was 72 angstrom (7.2 nm).

Example 19

A silver-plated product was produced by the same method as that in Example 1, except that an aqueous silver-plating solution containing 68 g/L of silver cyanide (AgCN), 64 g/L of sodium cyanide (NaCN) and 2 g/L of 2-mercaptobenzimidazole (2-MBI) was used as the silver-plating solution and that the electroplating (silver-plating) was carried out at a current density of 1.0 A/$dm^2$ for 9 minutes. The thickness of the substantially central portion of the silver-plating film of the silver-plated product was measured by the same method as that in Example 1, so that the thickness was 5 μm. Furthermore, assuming that the concentrations of silver cyanide (AgCN), sodium cyanide (NaCN) and 2-mercaptobenzimidazole (2-MBI) in the silver-plating solution for forming the silver-plating film of the silver-plated product were A (g/L), B (g/L) and C (g/L), respectively and that the current density during the electroplating was D (A/$dm^2$) , A/D=68 (g·$dm^2$/L·A), B/D=64 (g·$dm^2$/L·A) and C/D=2.0 (g·$dm^2$/L·A).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 161. It was confirmed that the base material was not exposed after the reciprocating sliding movement was repeated 1,000 times, so that it was found that the wear resistance thereof was good. The average crystallite size of the silver-plating film was 122 angstrom (12.2 nm).

Example 20

A silver-plated product was produced by the same method as that in Example 19, except that the electroplating (silver-plating) for forming the silver-plating film was carried out at a current density of 1.5 A/$dm^2$ for 6 minutes. The thickness of the substantially central portion of the silver-plating film of the silver-plated product was measured by the same method as that in Example 1, so that the thickness was 5 μm. Furthermore, in the formation of the silver-plating film of the silver-plated product, A/D=45 (g·$dm^2$/L·A), B/D=43 (g·$dm^2$/L·A) and C/D=1.3 (g·$dm^2$/L·A).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 161. It was confirmed that the base material was not exposed after the reciprocating sliding movement was repeated 1,000 times, so that it was found that the wear resistance thereof was good. The average crystallite size of the silver-plating film was 87 angstrom (8.7 nm).

Example 21

A silver-plated product was produced by the same method as that in Example 19, except that the amount of sodium cyanide (NaCN) in the silver-plating solution was 74 g/L and that the electroplating (silver-plating) for forming the silver-plating film was carried out at a current density of 0.7 A/dm$^2$ for 13 minutes. The thickness of the substantially central portion of the silver-plating film of the silver-plated product was measured by the same method as that in Example 1, so that the thickness was 5 μm. Furthermore, in the formation of the silver-plating film of the silver-plated product, A/D=97 (g·dm$^2$/L·A) , B/D=106 (g·dm$^2$/L·A) and C/D=2.9 (g·dm$^2$/L·A).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 166. It was confirmed that the base material was not exposed after the reciprocating sliding movement was repeated 1,000 times, so that it was found that the wear resistance thereof was good. The average crystallite size of the silver-plating film was 78 angstrom (7.8 nm).

Example 22

A silver-plated product was produced by the same method as that in Example 19, except that the amount of sodium cyanide (NaCN) in the silver-plating solution was 74 g/L and that the electroplating (silver-plating) for forming the silver-plating film was carried out at a current density of 1.0 A/dm$^2$ for 9 minutes. The thickness of the substantially central portion of the silver-plating film of the silver-plated product was measured by the same method as that in Example 1, so that the thickness was 5 μm. Furthermore, in the formation of the silver-plating film of the silver-plated product, A/D=68 (g·dm$^2$/L·A), B/D=74 (g·dm$^2$/L·A) and C/D=2.0 (g·dm$^2$/L·A).

With respect to the silver-plated product thus obtained, the measurement of the Vickers hardness HV of the silver-plating film, the evaluation of the wear resistance thereof and the calculation of the crystallite sizes thereof were carried out by the same methods as those in Example 1. As a result, the Vickers hardness HV was 162. It was confirmed that the base material was not exposed after the reciprocating sliding movement was repeated 1,000 times, so that it was found that the wear resistance thereof was good. The average crystallite size of the silver-plating film was 106 angstrom (10.6 nm).

The producing conditions and characteristics of the silver-plated products obtained in these examples and comparative examples are shown in Tables 1 through 9.

TABLE 1

| | Thickness of Ni-Plating Film (μm) | Silver-Plating Solution KAg(CN)$_2$ (g/L) | KCN (g/L) | 2-MBI (g/L) | $K_2CO_3$ (g/L) | Se (mg/L) |
|---|---|---|---|---|---|---|
| Ex. 1 | 1 | 40 | 39 | 1 | — | — |
| Ex. 2 | 1 | 40 | 39 | 1 | — | — |
| Ex. 3 | 1 | 40 | 39 | 2 | — | — |
| Ex. 4 | 1 | 100 | 39 | 1 | — | — |
| Ex. 5 | 1 | 100 | 39 | 2 | — | — |
| Ex. 6 | 1 | 40 | 39 | 1 | 20 | — |
| Ex. 7 | — | 40 | 39 | 1 | — | — |
| Ex. 8 | 1 | 40 | 39 | 2 | — | — |
| Ex. 9 | 1 | 40 | 39 | 1 | — | — |
| Ex. 10 | 1 | 40 | 39 | 1 | — | — |
| Ex. 11 | 1 | 40 | 39 | 2 | — | — |
| Comp. 1 | 1 | 40 | 39 | — | — | — |
| Comp. 2 | 1 | 40 | 39 | — | — | — |
| Comp. 3 | 1 | 40 | 39 | 1 | — | — |
| Comp. 4 | 1 | 40 | 39 | 2 | — | — |
| Comp. 5 | 1 | 40 | 99 | 1 | — | — |
| Comp. 6 | 1 | 40 | 99 | 2 | — | — |
| Comp. 7 | 1 | 100 | 39 | 1 | — | — |
| Comp. 8 | 1 | 100 | 39 | 1 | — | — |
| Comp. 9 | 1 | 100 | 99 | 1 | — | — |
| Comp. 10 | 1 | 100 | 99 | 2 | — | — |
| Comp. 11 | 1 | 115 | 60 | — | — | 40 |
| Comp. 12 | 1 | 148 | 140 | — | — | 8 |
| Comp. 13 | 1 | 175 | 95 | — | — | 70 |
| Comp. 14 | 1 | 40 | 39 | 1 | 20 | — |
| Comp. 15 | 1 | — | — | — | — | — |

TABLE 2

| | Silver-Plating Liquid (° C.) Temp. | Current (A/dm$^2$) Density | Time (min.) | A/D (g · dm$^2$/L · A) | B/D (g · dm$^2$/L · A) | C/D (g · dm$^2$/L · A) |
|---|---|---|---|---|---|---|
| Ex. 1 | 25 | 0.5 | 18 | 80 | 78 | 2.0 |
| Ex. 2 | 25 | 0.7 | 13 | 57 | 56 | 1.4 |
| Ex. 3 | 25 | 0.5 | 18 | 80 | 78 | 4.0 |
| Ex. 4 | 25 | 0.5 | 18 | 200 | 78 | 2.0 |
| Ex. 5 | 25 | 1.5 | 6 | 67 | 26 | 1.3 |
| Ex. 6 | 25 | 0.5 | 18 | 80 | 78 | 2.0 |
| Ex. 7 | 25 | 0.5 | 18 | 80 | 78 | 2.0 |
| Ex. 8 | 25 | 1.0 | 9 | 40 | 39 | 2.0 |
| Ex. 9 | 18 | 0.5 | 18 | 80 | 78 | 2.0 |
| Ex. 10 | 35 | 0.5 | 18 | 80 | 78 | 2.0 |
| Ex. 11 | 25 | 0.5 | 7.2 | 80 | 78 | 4.0 |
| Comp. 1 | 25 | 0.5 | 18 | 80 | 78 | 0 |
| Comp. 2 | 25 | 1.5 | 6 | 27 | 26 | 0 |
| Comp. 3 | 25 | 1.0 | 9 | 40 | 39 | 1.0 |
| Comp. 4 | 25 | 1.5 | 6 | 27 | 26 | 1.3 |
| Comp. 5 | 25 | 1.5 | 6 | 27 | 66 | 0.7 |
| Comp. 6 | 25 | 0.5 | 18 | 80 | 198 | 4.0 |
| Comp. 7 | 25 | 1.0 | 9 | 100 | 39 | 1.0 |
| Comp. 8 | 25 | 1.5 | 6 | 67 | 26 | 0.7 |
| Comp. 9 | 25 | 1.5 | 6 | 67 | 66 | 0.7 |
| Comp. 10 | 25 | 0.5 | 18 | 200 | 198 | 4.0 |
| Comp. 11 | 25 | 2.0 | 5 | 58 | 30 | 0 |
| Comp. 12 | 16 | 8.0 | 1.3 | 19 | 18 | 0 |
| Comp. 13 | 18 | 5.0 | 2 | 35 | 19 | 0 |
| Comp. 14 | 25 | 1.0 | 9 | 40 | 39 | 1.0 |
| Comp. 15 | 18 | 3.0 | 8.3 | — | 0 | 0 |

TABLE 3

| | Thickness of Silver-Plating Film (μm) | Vickers Hardness HV | Number of Durable Times (Number of Times) | Average Crystallite Size (nm) |
|---|---|---|---|---|
| Ex. 1 | 5 | 171.1 | not less than 1000 | 12.778 |
| Ex. 2 | 5 | 187.7 | not less than 1000 | 14.734 |
| Ex. 3 | 5 | 165.6 | not less than 1000 | 14.370 |
| Ex. 4 | 5 | 181.2 | not less than 1000 | 23.146 |
| Ex. 5 | 5 | 165.5 | not less than 1000 | 10.015 |
| Ex. 6 | 5 | 188.6 | not less than 1000 | 16.607 |
| Ex. 7 | 5 | 175.7 | not less than 1000 | 15.682 |
| Ex. 8 | 5 | 170.4 | not less than 1000 | 15.682 |
| Ex. 9 | 5 | 194.1 | not less than 1000 | 10.503 |
| Ex. 10 | 5 | 185.8 | not less than 1000 | 16.856 |
| Ex. 11 | 2 | 154.3 | not less than 800 | 20.940 |
| Comp. 1 | 5 | 105.8 | 60 | 43.498 |
| Comp. 2 | 5 | 112.7 | — | 62.539 |
| Comp. 3 | 5 | 131.2 | — | 16.006 |
| Comp. 4 | 5 | 131.1 | 100 | 10.520 |
| Comp. 5 | 5 | 118.6 | — | 31.816 |
| Comp. 6 | 5 | 121.3 | 80 | 73.665 |
| Comp. 7 | 5 | 138.4 | 200 | 20.578 |
| Comp. 8 | 5 | 130.8 | — | 31.846 |
| Comp. 9 | 5 | 120.1 | — | 38.193 |
| Comp. 10 | 5 | 121.4 | 70 | 39.148 |
| Comp. 11 | 5 | 118.9 | 100 | 63.573 |
| Comp. 12 | 5 | 82.4 | 50 | 74.972 |
| Comp. 13 | 5 | 133.8 | 80 | 27.825 |
| Comp. 14 | 5 | 134.4 | less than 10 | 19.283 |
| Comp. 15 | 5 | 170.4 | 150 | 12.611 |

TABLE 4

| | Thickness of Ni-Plating | Silver-Plating Solution | | |
|---|---|---|---|---|
| | Film (μm) | $KAg(CN)_2$ (g/L) | KCN (g/L) | 2-MBIS (g/L) |
| Ex. 12 | 1 | 100 | 39 | 20 |
| Ex. 13 | 1 | 100 | 39 | 20 |
| Ex. 14 | 1 | 100 | 39 | 20 |

TABLE 5

| | Silver-Plating | | | | | |
|---|---|---|---|---|---|---|
| | Liquid Temp. (° C.) | Current ($A/dm^2$) Density | Time (min.) | A/D ($g \cdot dm^2/L \cdot A$) | B/D ($g \cdot dm^2/L \cdot A$) | C/D ($g \cdot dm^2/L \cdot A$) |
| Ex. 12 | 25 | 0.7 | 13 | 143 | 56 | 28.6 |
| Ex. 13 | 25 | 1.0 | 9 | 100 | 39 | 20.0 |
| Ex. 14 | 25 | 1.5 | 6 | 67 | 26 | 13.3 |

TABLE 6

| | Thickness of Silver-Plating Film (μm) | Vickers Hardness HV | Number of Durable Times (Number of Times) | Average Crystallite Size (nm) |
|---|---|---|---|---|
| Ex. 12 | 5 | 226 | not less than 1000 | 9.7 |
| Ex. 13 | 5 | 175 | not less than 1000 | 11.2 |
| Ex. 14 | 5 | 155 | not less than 500 | 13.8 |

TABLE 7

| | Thickness of Ni Plating | Silver-Plating Solution | | |
|---|---|---|---|---|
| | Film (μm) | AgCN (g/L) | NaCN (g/L) | 2-MBI (g/L) |
| Ex. 15 | 1 | 27 | 39 | 1 |
| Ex. 16 | 1 | 27 | 39 | 1 |
| Ex. 17 | 1 | 27 | 39 | 1 |
| Ex. 18 | 1 | 27 | 39 | 2 |
| Ex. 19 | 1 | 68 | 64 | 2 |
| Ex. 20 | 1 | 68 | 64 | 2 |
| Ex. 21 | 1 | 68 | 74 | 2 |
| Ex. 22 | 1 | 68 | 74 | 2 |

TABLE 8

| | Silver-Plating | | | | | |
|---|---|---|---|---|---|---|
| | Liquid Temp. (° C.) | Current ($A/dm^2$) Density | Time (min.) | A/D ($g \cdot dm^2/L \cdot A$) | B/D ($g \cdot dm^2/L \cdot A$) | C/D ($g \cdot dm^2/L \cdot A$) |
| Ex. 15 | 25 | 0.5 | 18 | 54 | 78 | 2.0 |
| Ex. 16 | 25 | 0.7 | 13 | 39 | 56 | 1.4 |
| Ex. 17 | 35 | 0.5 | 18 | 54 | 78 | 2.0 |
| Ex. 18 | 25 | 1.5 | 6 | 18 | 26 | 1.3 |
| Ex. 19 | 25 | 1.0 | 9 | 68 | 64 | 2.0 |
| Ex. 20 | 25 | 1.5 | 6 | 45 | 43 | 1.3 |
| Ex. 21 | 25 | 0.7 | 13 | 97 | 106 | 2.9 |
| Ex. 22 | 25 | 1.0 | 9 | 68 | 74 | 2.0 |

TABLE 9

| | Thickness of Silver-Plating Film (μm) | Vickers Hardness HV | Number of Durable Times (Number of Times) | Average Crystallite Size (nm) |
|---|---|---|---|---|
| Ex. 15 | 5 | 166 | not less than 1000 | 9.0 |
| Ex. 16 | 5 | 176 | not less than 1000 | 8.1 |
| Ex. 17 | 5 | 175 | not less than 1000 | 10.9 |
| Ex. 18 | 5 | 152 | not less than 1000 | 7.2 |
| Ex. 19 | 5 | 161 | not less than 1000 | 12.2 |
| Ex. 20 | 5 | 161 | not less than 1000 | 8.7 |
| Ex. 21 | 5 | 166 | not less than 1000 | 7.8 |
| Ex. 22 | 5 | 162 | not less than 1000 | 10.6 |

The invention claimed is:

1. A method for producing a silver-plated product, the method comprising the steps of:

preparing a silver-plating solution which is an aqueous solution containing silver potassium cyanide, potassium cyanide and a benzimidazole, the concentration of potassium cyanide being 30 to 80 (g/L), the benzimidazole being 0.5 to 5 (g/L) of 2-mercaptobenzimidazole or 10 to 50 (g/L) of 2-mercaptobenzimidazole sulfonic acid sodium salt dihydrate; and forming a surface layer of silver on a base material by electroplating at a current density in the silver-plating solution so as to satisfy $A/D \geq 30 (g \cdot dm^2/L \cdot A)$ and $C/D \geq 1.2 (g \cdot dm^2/L \cdot A)$ assuming that a concentration of silver potassium cyanide in the silver-plating solution is A (g/L), that the concentration of potassium cyanide in the silver-plating solution is B (g/L), that the concentration of the benzimidazole in the silver-plating solution is C (g/L) and that the current density during the electroplating is D ($A/dm^2$).

2. A method for producing a silver-plated product as set forth in claim 1, wherein said silver-plating solution contains 30 g/L or less of potassium carbonate.

3. A method for producing a silver-plated product as set forth in claim 1, wherein said electroplating is carried out at a liquid temperature of 10 to 50° C.

4. A method for producing a silver-plated product as set forth in claim 1, wherein said electroplating is carried out at a current density of 0.2 to 2.0 $A/dm^2$.

5. A method for producing a silver-plated product as set forth in claim 1, wherein said base material is made of copper or a copper alloy.

6. A method for producing a silver-plated product as set forth in claim 1, wherein an underlying layer of nickel is formed between said base material and said surface layer.

7. A method for producing a silver-plated product, the method comprising the steps of:

preparing a silver-plating solution which is an aqueous solution containing silver potassium cyanide, potassium cyanide and a benzimidazole which is 0.5 to 5 (g/L) of 2-mercaptobenzimidazole or 10 to 50 (g/L) of 2-mercaptobenzimidazole sulfonic acid sodium salt dihydrate; and forming a surface layer of silver on a base material by electroplating at a current density in the silver-plating solution so as to satisfy $A/D \geq 30$ ($g \cdot dm^2/L \cdot A$), $B/D \leq 100$ ($g \cdot dm^2/L \cdot A$) and $C/D \geq 1.2$ ($g \cdot dm^2/L \cdot A$) assuming that a concentration of silver potassium cyanide in the silver-plating solution is A (g/L), that a concentration of potassium cyanide in the silver-plating solution is B (g/L), that the concentration of the benzimidazole in the silver-plating solution is C (g/L) and that the current density during the electroplating is D ($A/dm^2$).

8. A method for producing a silver-plated product as set forth in claim 7, wherein the concentration of potassium cyanide or sodium cyanide in the silver-plating solution is 30 to 80 g/L.

9. A method for producing a silver-plated product as set forth in claim 7, wherein said silver-plating solution contains 30 g/L or less of potassium carbonate.

10. A method for producing a silver-plated product as set forth in claim 7, wherein said electroplating is carried out at a liquid temperature of 10 to 50° C.

11. A method for producing a silver-plated product as set forth in claim 7, wherein said electroplating is carried out at a current density of 0.2 to 2.0 $A/dm^2$.

12. A method for producing a silver-plated product as set forth in claim 7, wherein said base material is made of copper or a copper alloy.

13. A method for producing a silver-plated product as set forth in claim 7, wherein an underlying layer of nickel is formed between said base material and said surface layer.

14. A method for producing a silver-plated product, the method comprising the steps of:

preparing a silver-plating solution which is an aqueous solution containing silver cyanide, sodium cyanide and a benzimidazole, the concentration of sodium cyanide being 30 to 80 (g/L) the benzimidazole being 0.5 to 5 (g/L) of 2-mercaptobenzimidazole or 10 to 50 (g/L) of 2-mercaptobenzimidazole sulfonic acid sodium salt dihydrate; and forming a surface layer of silver on a base material by electroplating at a current density in the silver-plating solution so as to satisfy $A/D \geq 15$ ($g \cdot dm^2/L \cdot A$) and $C/D \geq 1.2$ ($g \cdot dm^2/L \cdot A$) assuming that a concentration of silver cyanide in the silver-plating solution is A (g/L), that the concentration of sodium cyanide in the silver-plating solution is B (g/L), that the concentration of the benzimidazole in the silver-plating solution is C (g/L) and that the current density during the electroplating is D ($A/dm^2$).

15. A method for producing a silver-plated product as set forth in claim 14, wherein said silver-plating solution contains 30 g/L or less of potassium carbonate.

16. A method for producing a silver-plated product as set forth in claim 14, wherein said electroplating is carried out at a liquid temperature of 10 to 50° C.

17. A method for producing a silver-plated product as set forth in claim 14, wherein said electroplating is carried out at a current density of 0.2 to 2.0 $A/dm^2$.

18. A method for producing a silver-plated product as set forth in claim 14, wherein said base material is made of copper or a copper alloy.

19. A method for producing a silver-plated product as set forth in claim 14, wherein an underlying layer of nickel is formed between said base material and said surface layer.

20. A method for producing a silver-plated product, the method comprising the steps of:

preparing a silver-plating solution which is an aqueous solution containing silver cyanide, sodium cyanide and a benzimidazole which is 0.5 to 5 (g/L) of 2-mercaptobenzimidazole or 10 to 50(g/L) of 2-mercaptobenzimidazole sulfonic acid sodium salt dihydrate; and forming a surface layer of silver on a base material by electroplating at a current density in the silver-plating solution so as to satisfy $A/D \geq 15$ ($g \cdot dm^2/L \cdot A$), $B/D \leq 150$ ($g \cdot dm^2/L \cdot A$) and $C/D \geq 1.2$ ($g \cdot dm^2/L \cdot A$) assuming that a concentration of silver cyanide in the silver-plating solution is A (g/L), that a concentration of sodium cyanide in the silver-plating solution is B (g/L), that the concentration of the benzimidazole in the silver-plating solution is C (g/L) and that the current density during the electroplating is D ($A/dm^2$).

21. A method for producing a silver-plated product as set forth in claim 20, wherein the concentration of potassium cyanide or sodium cyanide in the silver-plating solution is 30 to 80 g/L.

22. A method for producing a silver-plated product as set forth in claim 20, wherein said silver-plating solution contains 30 g/L or less of potassium carbonate.

23. A method for producing a silver-plated product as set forth in claim 20, wherein said electroplating is carried out at a liquid temperature of 10 to 50° C.

24. A method for producing a silver-plated product as set forth in claim 20, wherein said electroplating is carried out at a current density of 0.2 to 2.0 $A/dm^2$.

25. A method for producing a silver-plated product as set forth in claim 20, wherein said base material is made of copper or a copper alloy.

26. A method for producing a silver-plated product as set forth in claim 20, wherein an underlying layer of nickel is formed between said base material and said surface layer.

* * * * *